United States Patent
Melnyk et al.

(10) Patent No.: US 8,496,829 B2
(45) Date of Patent: Jul. 30, 2013

(54) METHOD FOR REDUCING FOULING IN MICROFILTRATION SYSTEMS

(75) Inventors: Jason M. Melnyk, Fort Saskatchewan (CA); Ronald D. Frenette, Beaumont (CA); Shelley M. MacCallum, Edmonton (CA)

(73) Assignee: General Electric Company, Schenectady, NY (US)

( * ) Notice: Subject to any disclaimer, the term of this patent is extended or adjusted under 35 U.S.C. 154(b) by 1429 days.

(21) Appl. No.: 11/735,083

(22) Filed: Apr. 13, 2007

(65) Prior Publication Data

US 2008/0251457 A1    Oct. 16, 2008

(51) Int. Cl.
*B01D 65/06* (2006.01)
*B01D 65/08* (2006.01)
*B01D 15/00* (2006.01)

(52) U.S. Cl.
USPC .......................................... 210/636; 210/639

(58) Field of Classification Search
USPC .................................. 210/636, 639
See application file for complete search history.

(56) References Cited

U.S. PATENT DOCUMENTS

| | | | | |
|---|---|---|---|---|
| 5,433,863 A * | 7/1995 | Braden et al. | | 210/708 |
| 5,643,462 A * | 7/1997 | Chen et al. | | 210/730 |
| 5,830,315 A * | 11/1998 | Mitchell et al. | | 162/5 |
| 5,904,853 A | 5/1999 | Allen et al. | | |
| 6,428,705 B1 | 8/2002 | Allen et al. | | |
| 6,926,832 B2 | 8/2005 | Collins et al. | | |
| 2004/0065613 A1* | 4/2004 | Cadera et al. | | 210/639 |
| 2004/0173538 A1* | 9/2004 | Stewart | | 210/705 |
| 2005/0000895 A1* | 1/2005 | Cadera et al. | | 210/636 |
| 2006/0237372 A1* | 10/2006 | Arciszewski et al. | | 210/708 |
| 2007/0080112 A1* | 4/2007 | Langlais | | 210/639 |

FOREIGN PATENT DOCUMENTS

WO    WO 2005/068376    *    7/2005

* cited by examiner

*Primary Examiner* — Katherine Zalasky
(74) *Attorney, Agent, or Firm* — GE Global Patent Operation; Catherine J. Winter

(57) ABSTRACT

A process has been found which increases the efficiency and effectiveness of the overall filtration system, by reducing the fouling of the microfiltration system, thereby increasing its permeability and reducing the frequency of cleanings necessary. According to one embodiment of the invention, cationic coagulant is used to treat water in the early stages of a water treatment system, and to coagulate and flocculate the contaminants, and thereby resulting in reduced fouling of the microfiltration system, resulting in increase flux, less deposit of colloidal and particulate solids and dissolved organics on the surface of the microfiltration membrane, thereby reducing the frequency and duration of the membrane cleaning and ultimate replacement.

17 Claims, 1 Drawing Sheet

METHOD FOR REDUCING FOULING IN MICROFILTRATION SYSTEMS

FIELD OF THE INVENTION

The field of the invention relates to use of coagulants in water processing systems. More particularly, the invention relates to decreasing the fouling of microfiltration systems and coordinately increasing the life of microfiltration systems used in water clarification.

BACKGROUND OF THE INVENTION

Many different types of manufacturing operations rely on large quantities of water for various reasons, such as for cooling systems, or produce large quantities of wastewater, which need to be treated. These industries include, but are not limited to, agriculture, petroleum, chemical, pharmaceutical, mining, metal plating, textile, brewing, food and beverage processing, and semiconductor industries. These industries are strictly regulated with regards to the level of contaminants in their discharge wastewater. Additionally, water drawn into the facilities for use such as in cooling towers, are drawn in from various supplies, such as river water, and contaminants and other compounds need to be removed so that they will not cause scale formations, nor in otherwise clog or damage the equipment used in the processes. Current techniques for treating such water include large settling ponds, clarifiers and filtration systems that include large amounts of polymer additives. Biological treatment of water for removal of dissolved organic materials is well known and widely practiced in many industries today. The process includes sedimentation of microorganisms in order to separate the microorganisms from the water and to reduce the amount of Total Suspended Solids (TSS) in the final effluent. The sedimentation step usually takes place in a clarifier unit. Thus, the biological process is constrained by the need to produce biomass that has good settling properties.

Membrane costs are directly related to the membrane area needed for a given volumetric flow through the membrane, or "flux". Flux is expressed as liters/hour/$m^2$ (LMH) or gallons/dat/$ft^2$ (GFD). Typical flux rates vary from approximately 10 LMH to about 50 LMH. These relatively low flux rates are due largely to the fouling of the membranes and slow processing down.

The membrane, for instance a microfiltration membrane, interfaces with "mixed liquor" which is composed of water, dissolved solids such as proteins, polysaccharides, suspended solids such as colloidal and particulate material, aggregates of bacteria or "flocs", free bacteria, protozoa and various dissolved metabolites and cell components. In operation, the colloidal and particulate solids and dissolved organics deposit on the surface of the membrane. Colloidal particles form a layer on the surface of the membrane, while small particles can plug the membrane pores, a fouling condition that may not be reversible. Pore plugging and the colloidal layer on the membrane, increase resistance and decrease flux, thereby reducing the effectiveness of the membrane and requiring frequent cleaning.

Additionally, during periods of high organic loading, for instance, in cases involving river or pond water, when there are periods of high run-off into the water source or increased levels of rain which would increase the amount of sediments and TSS in the water sources, it is difficult to maintain optimum conditions. In such situations, it is found that the filtration systems, particularly the microfiltration systems, need to be cleaned or replaced on an even more frequent basis.

It is know in the art to process wastewater to remove certain contaminants. For instance, U.S. Pat. No. 5,904,853 discloses a process for removing metal and certain non-metal contaminants by treating with a chemical coagulant. In U.S. Pat. No. 6,428,705, a process and apparatus for removing g metals and other inorganic and organic contaminants from large volumes of wastewater is taught, where in chemical coagulants of a specific nature and molecular weight are used. In U.S. Pat. No. 6,926,832 the use of water soluble cationic, amphoteric or zwitterionic polymers to condition mixed liquor in membrane biological reactors resulting in reduced fouling and increased water flux through the membrane is taught.

However, a need still exists for an efficient and effective process that would decrease the fouling of the microfiltration systems, providing less frequent cleaning and/or replacement and would enhance the overall filtration process.

SUMMARY OF THE INVENTION

A process has been found which increases the efficiency and effectiveness of the overall filtration system, by reducing the fouling of the microfiltration system, thereby increasing its permeability and reducing the frequency of cleanings necessary.

According to one embodiment of the invention, cationic coagulant is used to treat water in the early stages of a water treatment system, and to coagulate and flocculate the contaminants, and thereby resulting in reduced fouling of the microfiltration system, resulting in increased flux, less deposit of colloidal and particulate solids and dissolved organics on the surface of the microfiltration membrane, thereby reducing the frequency and duration of the membrane cleaning and ultimate replacement.

The various features of novelty that characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

DETAILED DESCRIPTION OF THE INVENTION

While the present invention has been described with references to preferred embodiments, various changes or substitutions may be made on these embodiments by those ordinarily skilled in the art pertinent to the present invention without departing from the technical scope of the present invention. Therefore, the technical scope of the present invention encompasses not only those embodiments described above, but also all that fall within the scope of the appended claims.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

Figure 1:
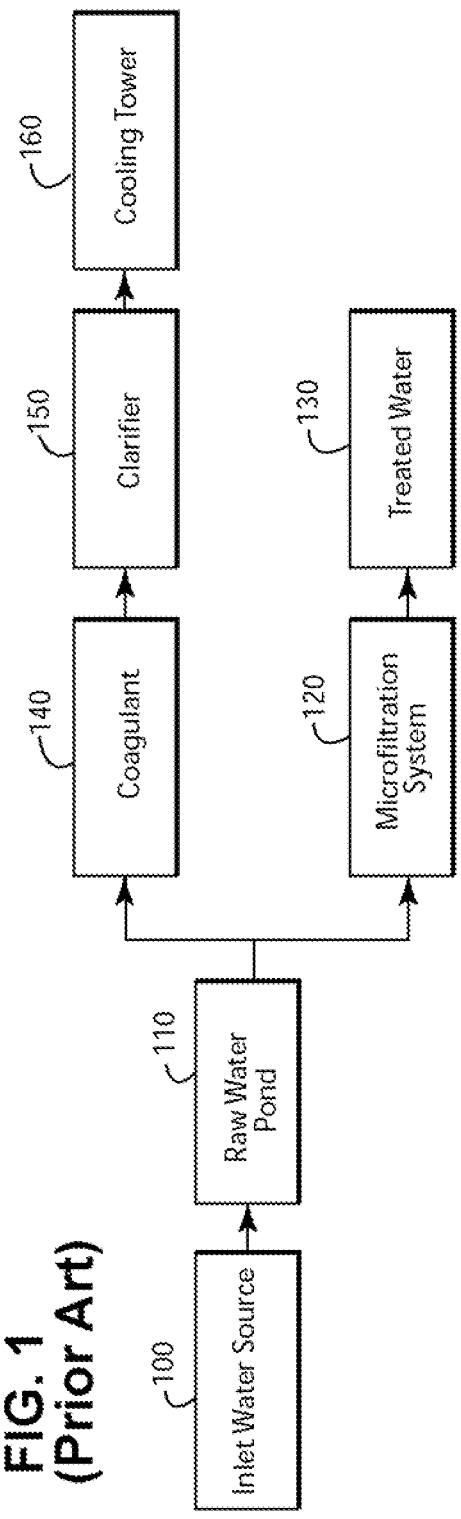
FIG. 1 is a schematic representation of one process according to the prior art.
Figure 2:
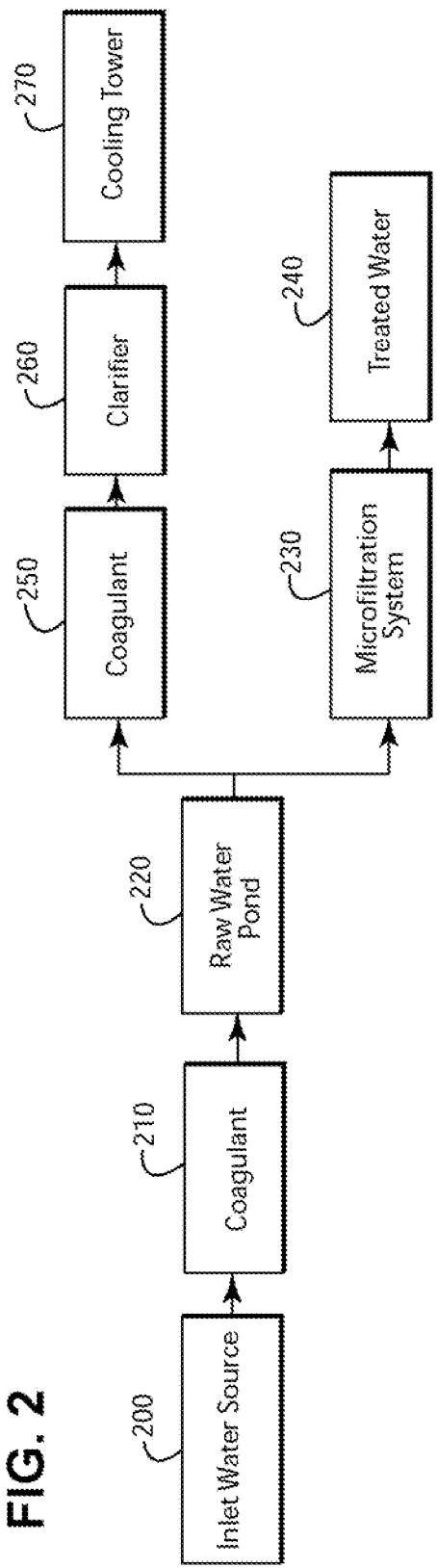
FIG. 2 is a schematic representation in accordance with one embodiment of the invention.

One embodiment of the present invention is directed to a process for reducing the fouling of microfiltration systems that is used in water treatment processes. In operation, the water to be treated is collected or obtained from its source, and subjected to treatment by a cationic coagulant prior to its being directed to a raw water pond or holding tank. As shown in FIG. 1, which is a block diagram of a prior art process, water proceeds from an inlet water source 100, to a raw water pond 110 or other holding tank. The water is held at the pond, to allow for settling of solids and contaminants. Thereafter, the water proceeds from the raw water pond 110, and is split into two streams, one which proceeds to a microfiltration system 120, where it is filtered and then on to collection as treated water 130. The second stream of water that leaves the holding tank 110, is treated with a coagulant 140 prior to being subjected to the clarifier 150, and then on to the cooling tower 160, or other intended use. In an alternate embodiment, the second stream of water is treated with a coagulant 140 and then proceeds directly on to its use, such as a cooling tower, without being subjected to a clarifier.

This known process differs from one embodiment of the presently claimed process in that water is obtained form an inlet water source 200 and is immediately treated with a coagulant 210 prior to proceeding on to a raw water pond 220. The remainder of the process of treatment is similar to that known in the industry. The water in the raw water pond 220 proceeds and is split into two streams, one of which is treating with a second coagulant 250 prior to proceeding onto a functional or point of use, such as in a cooling tower 270. These stream may be subjected to a clarifier 260 prior to proceeding on to a point of use, such as a cooling tower. The second stream of water from the raw water pond 220, proceeds to the microfiltration system 230 and then on as treated water 240.

In prior processes, it has not been the general practice to use water-soluble coagulants or flocculants in water treatment processes, except after the water has already passed through a microfiltration system, or as is shown in FIG. 1, in a stream that does not proceed through the microfiltration system. This is due to the fact that it has been generally understood that the use of such a coagulant actually increases the fouling of microfiltration systems and other membranes, and results in dramatic decreases in membrane or microfiltration system flux. In an alternate embodiment, the filtration system is an ultrafiltration system instead of the microfiltration system.

However, we have found that by using cationic coagulants, particularly those which are an organic and inorganic cationic polymer blend, the microfiltration system performs more efficiently and lowers the times required to clean the microfiltration system at levels of up to about 95%.

Additional benefits have also been found by introduction of a coagulant at prior to the microfiltration or ultrafiltration system in the process. In particular, there is better color removal from the influent water, improved turbidity removal, low aluminum carryover and low dosage requirements.

The input or influent water may come from a multitude of possibilities; some examples include but are not limited to, rivers, ponds and industrial wastewater. The inlet water is directed to a holding facility or tank, such as but not limited to a raw water pond, wherein it is held for varying amounts of time, depending on the process conditions and the facility.

The cationic coagulant can be one of many available coagulants. In particular, cationic polymers have been found to be useful. Cationic polymer means a polymer having an overall positive charge. The cationic polymers of this invention include polymers composed of cationic and nonionic monomers. Cationic polymers of this invention include, but are not limited to, solution polymers, emulsion polymers, and dispersion polymers. Inorganic and organic cationic polymer blends have been found to be useful in one embodiment of the invention, for example Klaraid CKP 1348™ (GE Betz Canada, Inc., Mississauga, Ontario, Canada). For cationic polymers that are blends of organic and inorganic polymers, the blend comprises from about 10 to about 50% organic polymers, and in an alternate embodiment, comprises from about 15 to about 25% organic materials. Inorganic polymers include, for example, polyaluminum chloride, and organic polymers include, for example, tannins. The high charge density of this particular product results in outstanding removal of inorganic and organic colloids, oily solids and color-causing contaminants in water treatment systems. In another embodiment the cationic coagulant is a blend of organic polymers.

In one embodiment of this invention, the coagulant added prior to the raw water pond or holding tank, the initial coagulant is the same as the second coagulant, which is added subsequent to the raw water pond or holding tank. In some embodiments, this second coagulant is added prior to a clarifier. In an alternate embodiment, the initial coagulant differs from the second coagulant. The initial coagulant is added in an amount of from about 20 to about 120 ppm.

As stated above, additional benefits are derived from the use of the initial coagulant in the process. The color of the water to be treated decreases drastically, from about 80 to about 100% of the color is removed, optimally, from about 94 to about 100% removal takes place from the addition of the initial cationic coagulant.

The addition of the initial cationic coagulant also has a beneficial effect on the turbidity of the input water. Addition of the initial cationic coagulant decreases the turbidity levels to from about 2 to about 10% of the initial values, preferably from about 3 to about 7% of the initial value.

Another benefit received from a present embodiment is the limited amount of aluminum carryover, amounts of less than about 0.3 ppm to less than about 0.1 ppm.

The foregoing may be better understood by reference to the following Example, which are presented for purposes of illustration and are not intended to limit the scope of this invention.

Example

Raw water from a river was collected and measured for turbidity, color, total organic carbon (TOC) and aluminum carryover, as compared to the same water with various dosages of two different cationic coagulants, polyaluminum chloride (PAC) and Klaraid CDP 1348™ (GE Betz Canada, Inc., Mississauga, Ontario, Canada). The results are shown in the following tables.

| PAC Dosage ppm | Turbidity NTU | Color PTC | TOC ppm | Aluminum ppm |
|---|---|---|---|---|
| RAW | 49.1 | 186 | 9.16 | |
| 100 | 2.69 | 58 | 7.86 | 0.29 |
| 120 | 2.47 | 38 | 4.01 | 0.23 |
| 140 | 2.51 | 19 | 3.82 | 0.19 |

| Klaraid CDP 1348 Dosage (ppm) | Turbidity ppm | Color ppm | TOC ppm | Aluminum ppm |
|---|---|---|---|---|
| RAW | 49.1 | 186 | 9.16 | |
| 80 | 1.71 | 8 | 4.92 | 0.08 |
| 100 | 1.70 | 8 | 4.73 | 0.09 |
| 120 | 2.35 | 10 | 4.83 | 0.13 |

Klaraid CDP 1348™ exhibited the best overall results, including best color removal, and lowest aluminum carryover. As shown, the optimal dosage for this coagulant was at a 30 to 40% lower level than PAC.

While the present invention has been described with references to preferred embodiments, various changes or substitutions may be made on these embodiments by those ordinarily skilled in the art pertinent to the present invention without departing from the technical scope of the present invention. Therefore, the technical scope of the present invention encompasses not only those embodiments described above, but also all that fall within the scope of the appended claims.

What is claimed is:

1. A process for reducing the fouling of microfiltration systems comprising adding to an inlet water source an effective amount of a cationic coagulant, wherein the cationic coagulant is a blend of organic and inorganic polymers, and wherein the organic polymers include tannins.

2. The process according to claim 1 wherein the coagulant is added prior to a raw water pond.

3. The process according to claim 2 where an additional coagulant is added subsequent to the raw water pond.

4. The process according to claim 1 wherein the blend of inorganic and organic cationic polymers is comprised of from about 10 to about 50% organic polymers.

5. The process according to claim 1 wherein the blend of inorganic and organic cationic polymers is comprised of from about 15 to about 25% organic polymers.

6. The process according to claim 5 wherein the cationic coagulant is added in an amount of about 20 to about 120 ppm.

7. The process according to claim 5 wherein turbidity of the water decreases from about 85 to about 99 percent after addition of the cationic coagulant.

8. The process according to claim 5 wherein the turbidity value is from about 1.5 to about 2.5 NTUs.

9. The process according to claim 1 wherein the microfiltration system is comprised of an ultrafiltration system.

10. The process according to claim 1, wherein the coagulant is added prior to a raw water pond or holding tank, and wherein the blend of inorganic and organic polymers is comprised of from about 10 to about 50% organic polymers, and wherein the cationic coagulant is added in an amount of about 20 to about 120 ppm.

11. A process for reducing the fouling of microfiltration systems comprising the steps of:
  a) drawing influent water to be treated from a source;
  b) adding an effective amount of an initial cationic coagulant, comprised of a blend of inorganic and organic polymers wherein the organic polymers include tannins, to the water to be treated prior to its placement in a raw water pond or holding tank; and
  c) dividing the water from the holding tank or pond into two streams, one that proceeds to the microfiltration system, and one that proceeds on to a point of use.

12. The process of claim 11 wherein the water stream, which proceeds to a point of use is treated with a second cationic coagulant subsequent to the settling pond.

13. The process of claim 12 wherein the second cationic coagulant is the same as the initial cationic coagulant.

14. The process according to claim 11 wherein the initial and second cationic coagulants are blends of inorganic and organic cationic polymers.

15. The process according to claim 11 wherein the turbidity levels are decreased to levels of from about 2 to about 10% of initial values.

16. The process according to claim 11 where the stream proceeding to a point of use is first passed through a clarifier.

17. A process for reducing the fouling of microfiltration systems comprising the steps of:
  a) drawing influent water to be treated from a source, wherein the source is susceptible to an increase in an amount of sediments and TSS caused by run-off;
  b) adding an effective amount of an cationic coagulant comprised of a blend of inorganic polymers and organic polymers wherein the organic polymers include tannins to the influent water, prior to its placement in a raw water pond or holding tank;
  c) placing the influent water into a raw water pond or holding tank; and
  d) directing a stream of water from the raw water pond or holding tank to a microfiltration system.

* * * * *